US012620224B2

(12) United States Patent
Helseth et al.

(10) Patent No.: US 12,620,224 B2
(45) Date of Patent: May 5, 2026

(54) BIRD DETECTION AND SPECIES DETERMINATION

(71) Applicant: SPOOR AS, Oslo (NO)

(72) Inventors: Ask Helseth, Oslo (NO); Helge Reikerås, Oslo (NO)

(73) Assignee: SPOOR AS, Oslo (NO)

( * ) Notice: Subject to any disclaimer, the term of this patent is extended or adjusted under 35 U.S.C. 154(b) by 204 days.

(21) Appl. No.: 18/286,783

(22) PCT Filed: Apr. 12, 2022

(86) PCT No.: PCT/NO2022/050085
§ 371 (c)(1),
(2) Date: Oct. 13, 2023

(87) PCT Pub. No.: WO2022/220692
PCT Pub. Date: Oct. 20, 2022

(65) Prior Publication Data
US 2024/0193946 A1     Jun. 13, 2024

(30) Foreign Application Priority Data

Apr. 15, 2021     (NO) .................................... 20210472

(51) Int. Cl.
*G06V 20/40*          (2022.01)
*G06T 7/60*          (2017.01)
(Continued)

(52) U.S. Cl.
CPC ................ *G06V 20/41* (2022.01); *G06T 7/60* (2013.01); *G06T 7/73* (2017.01); *G06V 10/774* (2022.01);
(Continued)

(58) Field of Classification Search
CPC ...... G06V 20/41; G06V 10/774; G06V 10/82; G06V 10/84; G06V 20/46; G06V 40/20;
(Continued)

(56) References Cited

U.S. PATENT DOCUMENTS

2013/0094700 A1*   4/2013   Mellor ..................... G06T 7/246
                                                        382/103
2016/0050889 A1*   2/2016   Wenger ................ H04N 23/698
                                                        348/47
(Continued)

FOREIGN PATENT DOCUMENTS

CN          106548192   A     3/2017
CN          110059641   A     7/2019
(Continued)

OTHER PUBLICATIONS

Simultaneous measurements of three-dimensional trajectories and wingbeat frequencies of birds in the field. Ling et al. (Year: 2018).*
(Continued)

*Primary Examiner* — Delomia L Gilliard
(74) *Attorney, Agent, or Firm* — Birch, Stewart, Kolasch & Birch, LLP

(57) ABSTRACT

Methods of determining the species of birds in flight are provided along with corresponding systems. A method may include capturing a video stream of a bird in flight using at least one camera, generating a first species probability estimate by delivering images from the video stream to a neural network that has been trained to recognize species of birds from images, obtaining additional parameters from the video stream or from additional data, generating a second species probability estimate by delivering the additional parameters as input to a domain knowledge module with a domain knowledge statistical model, and generating a final species probability estimate by combining the first species probability estimate and the second species probability
(Continued)

estimate. The additional parameters may include geometry features related to movement of the bird in flight, or parameters relating to the environment.

20 Claims, 6 Drawing Sheets

(51) Int. Cl.

| | |
|---|---|
| *G06T 7/73* | (2017.01) |
| *G06V 10/774* | (2022.01) |
| *G06V 10/82* | (2022.01) |
| *G06V 10/84* | (2022.01) |
| *G06V 40/20* | (2022.01) |

(52) U.S. Cl.
CPC .............. *G06V 10/82* (2022.01); *G06V 10/84* (2022.01); *G06V 20/46* (2022.01); *G06V 40/20* (2022.01); *G06T 2207/10016* (2013.01); *G06T 2207/20056* (2013.01); *G06T 2207/20081* (2013.01); *G06T 2207/20084* (2013.01)

(58) Field of Classification Search
CPC .... G06V 10/806; G06V 10/809; G06V 20/52; G06T 7/60; G06T 7/73; G06T 2207/10016; G06T 2207/20056; G06T 2207/20081; G06T 2207/20084; G06N 3/02; G06N 3/045; F03D 80/10
See application file for complete search history.

(56) References Cited

U.S. PATENT DOCUMENTS

| | | | |
|---|---|---|---|
| 2016/0055399 A1* | 2/2016 | Hiester | ................. A01M 29/10 |
| | | | 382/110 |
| 2016/0055400 A1* | 2/2016 | Jorquera | .............. H04N 23/698 |
| | | | 416/61 |
| 2018/0171972 A1* | 6/2018 | Merz | ................... G05B 13/026 |
| 2018/0204111 A1 | 7/2018 | Zadeh et al. | |
| 2020/0125879 A1 | 4/2020 | Diehl | |
| 2020/0184278 A1 | 6/2020 | Zadeh et al. | |
| 2020/0257896 A1 | 8/2020 | Paszek et al. | |

FOREIGN PATENT DOCUMENTS

| | | |
|---|---|---|
| CN | 110689081 A | 1/2020 |
| DE | 10 2018 008 282 A1 | 4/2020 |
| GB | 2582988 A | 10/2020 |
| WO | WO 2020/043841 A1 | 3/2020 |

OTHER PUBLICATIONS

Deep learning-based automatic bird identification system for offshore wind farms. Niemi et al. accessed—https://onlinelibrary.wiley.com/doi/epdf/10.1002/we.2492 (Year: 2019).*

Norwegian Search Report dated Nov. 15, 2021 for Application No. 20210472 with an English translation.

\* cited by examiner

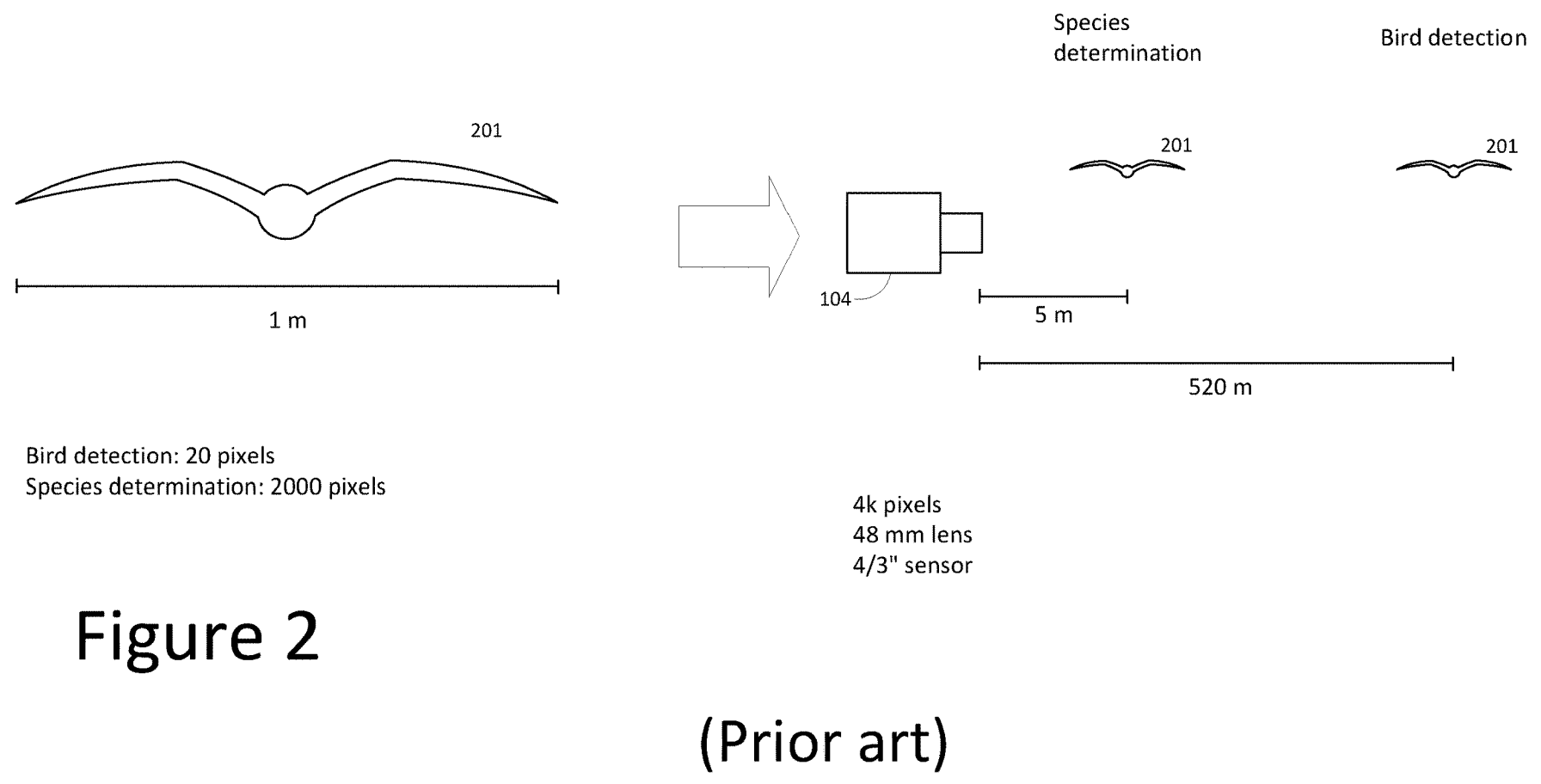

Bird detection

201

Species
determination

201

520 m 5 m

104

4k pixels
48 mm lens
4/3" sensor

201

1 m

Bird detection: 20 pixels
Species determination: 2000 pixels

Figure 2

(Prior art)

BIRD DETECTION AND SPECIES DETERMINATION

TECHNICAL FIELD

The present invention relates to automatic detection and species determination of birds, and in particular to detection and species identification using image recognition and machine learning.

BACKGROUND

As the world progresses towards less dependence on fossil energy sources, wind power is among the technologies that are becoming important alternatives. There are, however, certain disadvantages associated with wind power. Among these are the impact on biodiversity, and particularly the danger wind farms represent to bird populations. The wind power industry may have to conduct surveys of bird populations prior to establishing wind farms in order to estimate how the wind farms will impact those populations, and it may also become necessary to monitor bird population patterns and their developments around established wind farms.

In most cases, bird observations have to be made manually, since current systems for automatic monitoring does not provide sufficiently high-quality data and is expensive in terms of necessary equipment and processing power. For obvious reasons, manual observations are impractical and cannot be part of a continuous monitoring of bird populations over time. Consequently, there is a need for better systems based on computer vision, image processing and statistic processing and modelling.

Among the more specific needs of the industry are systems for detection, tracking and classification of species of birds in the vicinity of wind farms. Availability of such systems will greatly improve the effectiveness and efficiency of performing environmental impact assessment (EIAs) pre- and post-construction of wind farms. Additionally, such a system can assist operators of wind farms to implement mitigating measures to prevent birds from colliding with wind turbines during operation or pre-construction through adjusting the farm layout, controlling operation based on currently or recently observed bird species and behavior, and other mitigating measures.

In order to develop such systems, a number of technical challenges have to be overcome. Such challenges may relate to the requirement for high quality data input including determining which data to obtain as well as how accurate or detailed the data needs to be. Other challenges relate to the methods required for processing the input data in order to extract features indicative of the presence and behavior of birds, statistical models for interpreting the extracted features correctly, initiating appropriate mitigating measures, and more.

SUMMARY OF THE DISCLOSURE

This specification discloses methods, devices, and systems that address a number of the requirements discussed above in order to facilitate better mitigation of the risk wind turbines represent to birds in general, and vulnerable or endangered species of birds in particular. In particular, the invention addresses the problem of observing birds, detecting their presence, determining the species of individual birds, and developing statistics. Such results can be stored, displayed or delivered as input to controlling processes in order to better plan construction of wind farms, control their operation, and initiate deterrence and curtailment.

According to a first aspect of the invention a method is provided for determining the species of birds in flight. The method comprises capturing at least one video stream of a bird in flight using at least one camera, generating a first species probability estimate by delivering images from the at least one video stream as input to an artificial neural network that has been trained to recognize species of birds from images, obtaining additional parameters from the at least one video stream or from at least one additional data source, generating a second species probability estimate by delivering the obtained additional parameters as input to a domain knowledge module with a domain knowledge statistical model, and generating a final species probability estimate by combining the first species probability estimate and the second species probability estimate. The domain knowledge statistical model may be an influence diagram, for example a Bayesian belief network.

The additional parameters may be derived from the video stream, or they may be obtained from other data sources, such as additional sensors, or services accessible over a network such as the Internet.

Embodiments of the invention may further comprise extracting geometric features related to the bird in flight by delivering images from the at least one video stream as input to a geometry feature extraction module. The output from this process may be used in one, or both, of the following ways. The extracted geometric features, which may be related to how the bird moves in flight, may be used to contribute to the generation of the first species probability estimate by being delivered, together with extracted features from the artificial neural network, as input to a shallow neural network that has been trained to generate bird species probabilities based on features extracted by an artificial neural network combined with observed geometric features. The first species probability estimate may be the one species determined to be most likely, or respective probabilities for several species.

Instead, or in addition, the extracted geometric features from the geometry extraction module may contribute to the generation of the second species probability estimate by being delivering input to the domain knowledge statistical model. In other words, the extracted geometry features may be part of the obtained additional parameters.

In some embodiments of the invention there may be only one camera, or some cameras have a field of view that is at least partly not covered by any other camera, such that only one video stream is available. The extracted geometric features may then be obtained based on identification of the same bird in a sequence of images from the one video stream, and estimating motion based on the change of the identified bird's position between images in the sequence of images. This may be combined with estimates of distance from the camera, and also with other methods involving several cameras.

In embodiments where the at least one camera is two or more cameras and the at least one video stream is two or more video streams, the extracted geometric features may be obtained based on a known position of each camera, identification of the same bird in two or more sequences of images from two or more concurrent video streams, determination of the position of the identified bird in the respective images of the respective video streams, and using multi-view geometry analysis to determine 3D coordinates representative of positions of the identified bird relative to the positions of the cameras from the determined positions in the respective images of the respective video streams. The determined 3D coordinates may then be used to extract features selected from the group consisting of: positions, speed, acceleration, vertical motion, flight trajectory, and wingbeat frequency.

In some embodiments one of the extracted geometric features is a wingbeat frequency determined by performing Fourier analysis (for example using Fast Fourier Transform, FFT) on a sequence of images from the at least one video stream, and identifying a dominant frequency component that is inside a frequency interval consistent with wingbeat frequencies for birds.

The artificial neural network may be trained by delivering a dataset including labeled images of relevant bird species as input to the artificial neural network.

In order to detect and track birds in the video images, object detection on images from the at least one video stream may be performed, and the images may be annotated with bounding boxes drawn around each object that is identified as a bird. The annotations may also include identifications that represent the identity of an individual bird from one frame to the next. This annotation may be used by the artificial neural network as well as by the geometry feature extraction. This object detection is performed using a second artificial neural network.

The species determined to have the highest determined final species probability may be delivered as output, and the output may be used to control a means of deterrent or curtailment in order to reduce a risk that the bird of the determined species is injured by a wind farm installation. Alternatively, or in addition, the output may be stored, or displayed.

In a second aspect of the invention a system is provided for determining the species of birds in flight. Such a system may include at least one video camera, a artificial neural network configured to receive video images from the at least one of camera (104) and trained to recognize species of birds from images, a domain knowledge module with a domain knowledge statistical model, configured to receive observed values for additional parameters and to generate a probability of observing respective species of birds given observed values for the additional parameters, and a species determination module configured to receive a first species probability estimate based on output from the artificial neural network and a second species probability estimate based on output from the domain knowledge module and to generate a final species probability estimate. The domain knowledge statistical model may be an influence diagram, for example a Bayesian belief network.

Some embodiments of such a system may also have a geometry feature extraction module configured to receive at least one video stream from the at least one camera and to extract geometric features related to birds captured in flight in the at least one video stream. Depending on the further use of the extracted geometric features the system may also include a shallow neural network configured to receive extracted features from the artificial neural network and extracted geometry features from the geometry feature extraction module, and to generate the first species probability estimate. The system may also include a configuration of the domain knowledge module enabling it to receive extracted geometry features from the geometry feature extraction module as additional parameters. In other words, extracted geometry features may be used in combination with features extracted by the artificial neural network to generate the first species probability estimate, by the domain knowledge module to generate the second species probability estimate, or both.

Some embodiments of the system may also include a multi-view geometry analysis module configured to receive a known position for each camera, receive data related to at least two concurrent video streams, determine a position of a bird identified in the respective images of the respective video streams, determine the position of the identified bird in the respective images of the respective video streams, and use multi-view geometry analysis to determine 3D coordinates representative of positions of the identified bird relative to the positions of the cameras from the determined positions in the respective images of the respective video streams. Such a multi-view geometry analysis module may be part of the geometry feature module, or it may operate as a preprocessor to the feature extraction, in order to make estimated positions available for feature extraction. The geometry feature extraction module may then be configured to receive the determined 3D coordinates from the multi-view geometry analysis module and, based on the received 3D coordinates, extract features selected from the group consisting of: positions, speed, acceleration, vertical motion, flight trajectory, and wingbeat frequency. Additional parameters, or variables, are possible within the scope of the invention.

In order to facilitate detection and tracking of birds in video images, a bird detection and tracking module may be included. The bird detection and tracking module may be configured to receive input from at least one video camera and perform object detection and to annotate images by drawing bounding boxes around each object that is identified as a bird. Each camera may have its own detection and tracking device, or one computer may perform detection and tracking on video images from several cameras. The provided annotation, including bounding boxes and identification from one frame to the next, is typically included with the video data before feature extraction is performed. The bird detection and tracking module may include a second artificial neural network.

For all aspects and embodiments, one or more of the artificial neural networks may be a convolutional neural network.

A system according to the invention may deliver the final species probability estimate as output to be stored, displayed, or used to control a process of deterrence or curtailment in order to reduce a risk that the bird of the determined species is injured by a wind farm installation.

BRIEF DESCRIPTION OF THE DRAWINGS

FIG. 2 illustrates the limitations of prior art system that only rely on one method of bird species determination;

DETAILED DESCRIPTION

Figure 1:
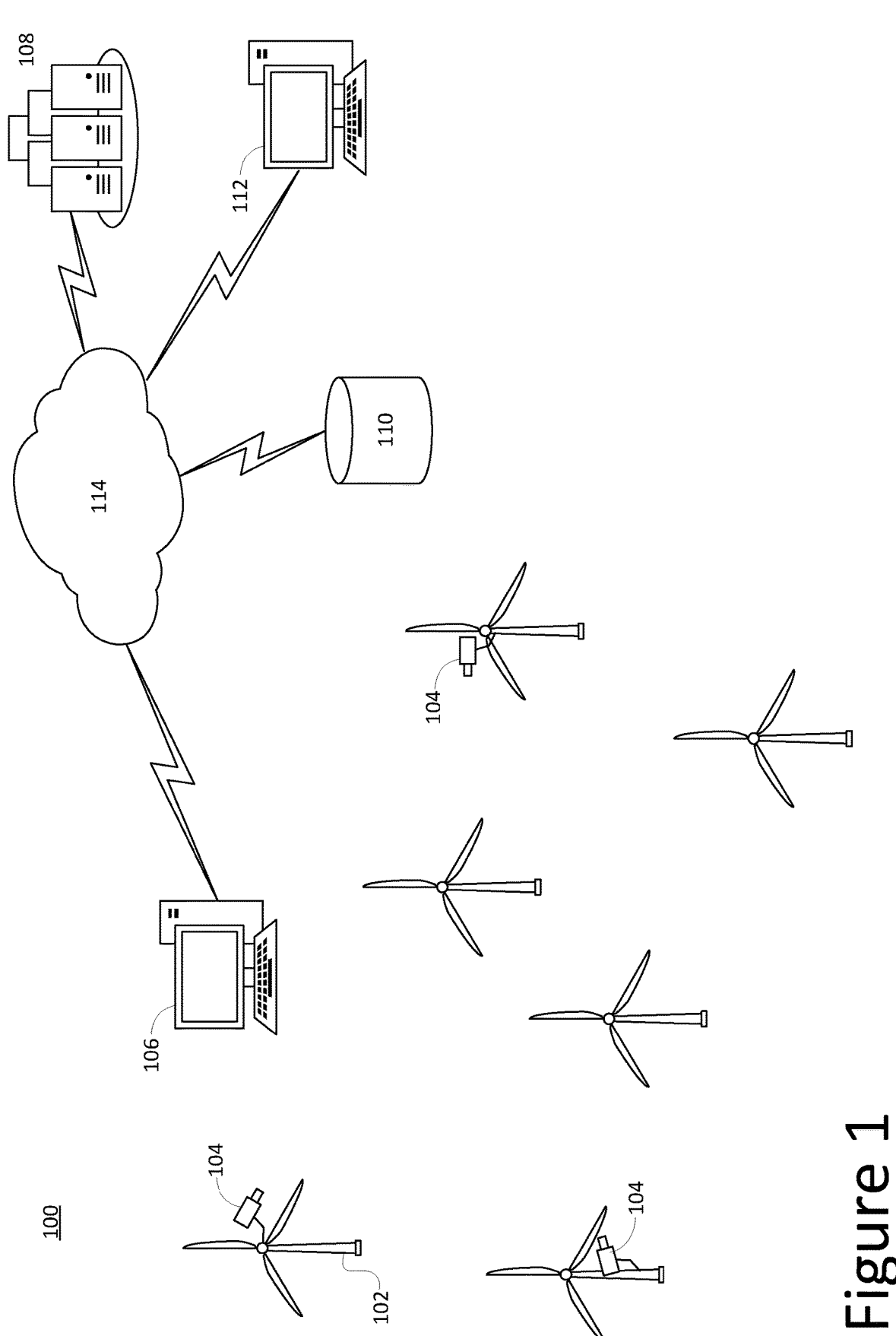
FIG. 1 shows an illustration of a windfarm utilizing a system according to the invention.

In the following description of embodiments, reference will be made to the drawings, in which like reference numerals denote the same or corresponding elements. When the drawings include a plurality of elements that are multiple instances of essentially identical elements, they are not all provided with reference numerals in order to avoid cluttering the drawings. The drawings are not necessarily to scale. Instead, certain features may be shown exaggerated in scale or in a somewhat simplified or schematic manner, wherein certain conventional elements may have been left out in the interest of exemplifying the principles of the invention rather than cluttering the drawings with details that do not contribute to the understanding of these principles.

It should be noted that, unless otherwise stated, different features or elements may be combined with each other whether or not they have been described together as part of the same embodiment below. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable, but for the sake of brevity, no attempt has been made to disclose a complete description of all possible permutations of features.

Furthermore, those with skill in the art will understand that the invention may be practiced without many of the details included in this detailed description. Conversely, some well-known structures or functions may not be shown or described in detail, in order to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Reference is first made to FIG. 1, which shows a representation of a wind farm 100 with a number of windmills 102, some of which are provided with cameras 104. At least some of the cameras 104 cameras may instead be mounted on buildings, radio towers, or other man made or natural objects. The cameras 104 may be connected to a local computer system 106 which may perform a number of operations in accordance with the invention. The local computer system 106 may comprise one or more computers. In some embodiments the local computer system 106 simply collect data from the cameras 104 and forward the collected data to a remote location such as one or more servers 108. Data received at the remote location(s) may be stored in a database 110 for later processing or delivered as input to one or more processing services that may be executed by the servers 108 and be accessible as cloud services. Processing, storing, and provision of collected information and processing results will collectively be referred to as cloud services in the present disclosure.

After data has been processed by the servers 108 the results may be stored in a database 110 from where they may be accessed by computers 112 in order to be displayed or utilized for controlling processes or making decisions.

The various components included in the system 100 may be connected to a computer network 114, such as the Internet.

In addition to the cameras 104, other sensors or data sources may also be included in or providing data to the system. Such additional sensors or data sources are not shown in the drawing but may include sources that provide weather data such as temperature, precipitation, wind, barometric pressure, and humidity. These sources may be sensors that are part of the system, or the system may be configured to obtain data from external sources or services accessible over the network 114, or both.

The local computer system 106 may in some embodiments be configured to perform operations on the images collected by the cameras 104 prior to forwarding the results to the cloud services. Such edge computing may include filtering, noise removal, normalization, and other pre-processing, as well as object detection and tracking, stereophotogrammetry or other forms of 3D reconstruction and feature extraction, as will be discussed in further detail below. In some embodiments even the species identification may be performed as edge computing, i.e. all processing may be performed at the edge but results and statistics may be stored centrally or distributed in other ways. Other embodiments may not include any edge computing. Instead, all processing may be performed as cloud services or in a dedicated data center.

The cameras 104 are connected to the local computer system 106 using wired or wireless streaming of data. In some embodiments the local computer system 106 comprises one or more computers which receive video streams from multiple cameras. In other embodiments each camera 104 has one dedicated computer module which receives data from only that camera and forwards the data as an individual stream to the cloud services. Such dedicated computer modules may even be integrated in the respective cameras 104.

The connection from the local computer system 106 to the cloud services may be wired or wireless. In order to be able to provide large amounts of video data from an offshore wind farm to onshore servers 108 optical fiber cables may be used.

As mentioned above, processing may be distributed such that some processing is performed as edge computing in one or more local computers 106 while additional processing is performed as cloud-based services performed by servers 108 connected to the network 114. The servers themselves may be one or more computers and they may be located in a single location or distributed over several locations. It should be realized that the system as such may be configured to utilize certain external computational resources, such as cloud-based machine learning services (machine learning as a service, or MLaaS). The invention is not limited to any particular distribution of functionality, except, of course, that cameras and sensors will have to be placed where they can obtain the required information. All other functionalities can be located in one single data center or distributed among several machines and/or locations in all possible permutations.

Much progress has been made in recent years in the field of computer vision (a research field concerned with making computers able to interpret and understand the visual world). This progress has primarily been made through use of deep learning, a class of machine learning algorithms based on artificial neural networks that work particularly well with "unstructured data" like images and text. However, current solutions using computer vision to detect and identify birds require relatively high-resolution images. In order to obtain such images, expensive high-quality cameras are necessary, and birds have to be relatively close to the camera when their images are captured. This means that very many cameras are necessary in order to cover an entire wind farm.

An example of the capabilities of a typical state of the art system is illustrated in FIG. 2. The example, which is a rough estimate only, assumes that 20 pixels are required in order to detect a bird and 2000 pixels is required to determine the species of a bird. For birds 201 with a wingspan of approximately 1 meter and with a camera with 4 k pixels image resolution, 48 mm lens, and a 4/3" sensor this means that birds can be detected at a distance of about 520 meters, but in order for the species to be determined the bird must get to within a distance of 5 meters from the camera. The actual specifications for existing systems may vary from this example, but it illustrates the point that the ability to identify species drops dramatically with distance and the potential advantages of having alternative or additional strategies to simply adding more cameras with higher resolution and more expensive optics.

It will thus be realized that the capabilities of a bird detection and species determination system is a tradeoff between camera resolution, focal length, sensor size, and number of cameras installed, as well as available bandwidth and computational power.

The present invention is based on the realization that computer vision and deep learning may be combined with additional strategies. In particular, the invention uses a domain knowledge statistical model, for example an influence diagram, such as a Bayesian Belief Network (BNN) to exploit knowledge and information in a manner based on how skilled ornithologists recognize birds. The exemplary embodiments described below utilize BNN as the domain knowledge statistical model, but the invention is not limited to this particular type of statistical modeling and other statistical models known in the art may be used as the domain knowledge statistical model. Similarly, the exemplary embodiments mainly utilize convolutional neural networks. The invention is, however, not limited to convolutional neural networks, particularly not when detection and tracking as well as species recognition are performed by a single neural network. Those with skill in the art will therefore understand that the invention may be implemented using other types of artificial neural networks.

Figure 3:
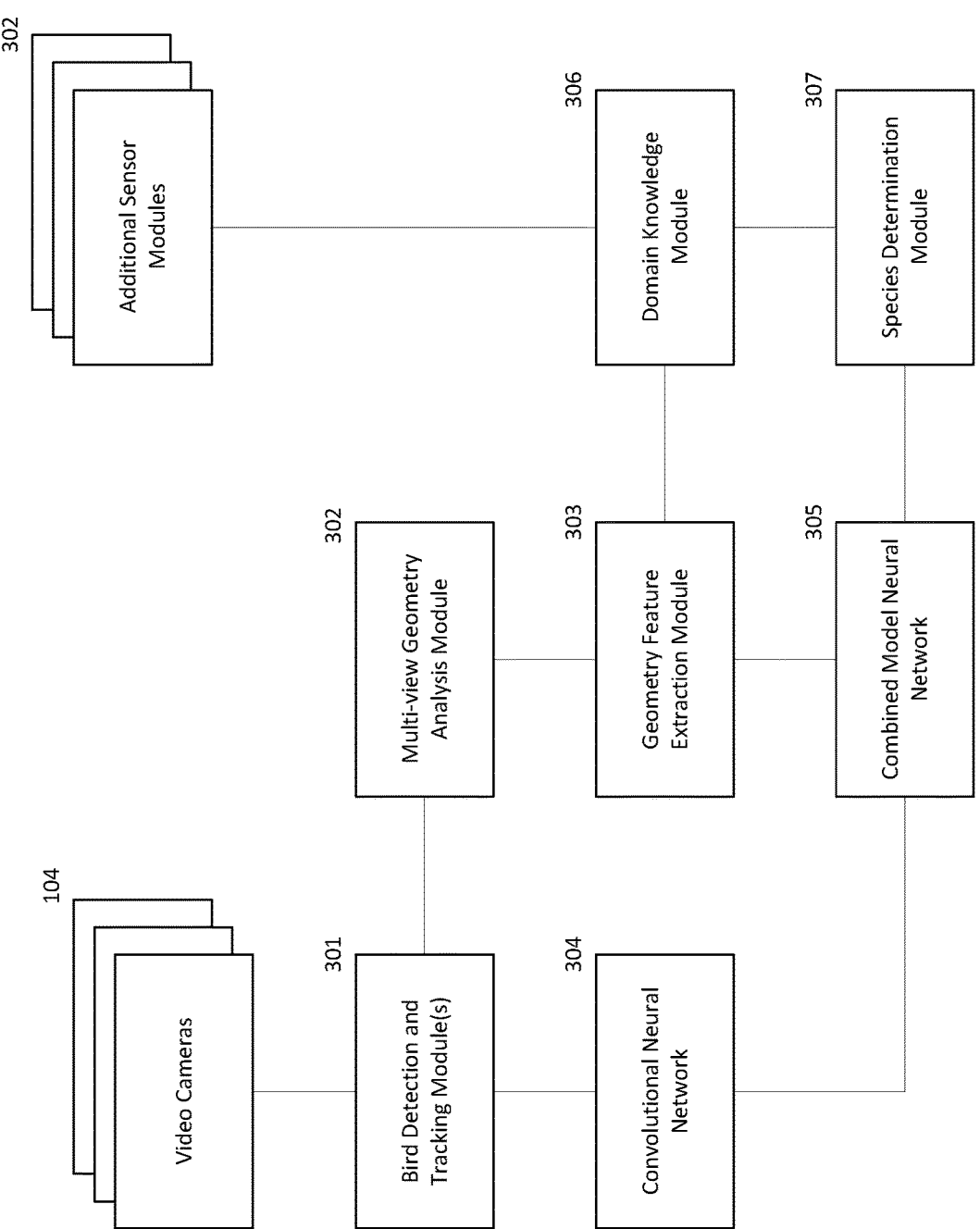
FIG. 3 is a block diagram showing modules included in an exemplary embodiment of the invention.

FIG. 3 shows the modular structure of an exemplary system in accordance with the invention. The system includes a plurality of video cameras 104. These cameras deliver video input to a bird detection and tracking module 301. In some embodiments these modules are implemented as edge computing services, for example by having one dedicated computer connected to one or a group of cameras 104 in order to detect objects that are likely to be birds and to annotate the video data before passing it on. Annotation will at least include drawing of a bounding box around identified birds and may also include an identification tag that may serve to identify the same bird from one frame to the next in order to track individual birds and enable analysis of motion. The edge computer(s) may also be configured to only upload video data when a possible bird is detected such that bandwidth is not used to transmit video images that will not be utilized.

The bird detection and tracking module 301, which will be described in further detail below, may be connected to a multi-view geometry analysis module 302. The multi-view geometry analysis module 302 may be configured to use stereophotogrammetry in order to estimate three dimensional (3D) coordinates for birds that are detected and tracked in the video input data received from the bird detection and tracking module(s) 301. Stereophotogrammetry and related technologies such as epipolar geometry and 3D pose estimation, are well known in the art and will not be discussed in detail herein but a short description will be given below with reference to FIG. 6. The output from the geometry analysis module is provided to a geometry feature extraction module 303. This module extracts features such as for example height, speed, flight pattern, wingbeat frequency, and size of the bird. Some of these features may be derived directly from the 3D coordinates determined by the geometry analysis module 302, for example height and flight pattern. Other features may have to combine this with other information. Size, for example, may be determined based on distance from camera (e.g., based on 3D coordinates and known positions of cameras) and size of a bounding box generated by the detection and tracking module 301. The generation of bounding boxes will be described in further detail below. Wingbeat frequency may in some embodiments be determined from variations in the 3D coordinates alone. In other embodiments, image analysis of data within the bounding box may be performed, for example by using Fourier analysis. The invention is not limited to the features mentioned in this example, and other features may also be considered in some embodiments.

The annotated video data from the bird detection and tracking module 301 is also provided to a convolutional neural network (CNN) 304. This CNN 304 may be trained on video data of birds where the species is known. The CNN 304 analyses each bounding box (i.e., each bird in a video image which may include several detected birds) as a separate image. During training the CNN 304 learns to identify features. These features are delivered as output form the CNN 304.

In order to combine the features detected by the geometry feature extraction module 303 with the features detected by the CNN 304, these are combined in a combined model neural network 305. This may be a shallow neural network (SNN) 305 which takes the output from the geometry feature extraction module 303 and the CNN 304 as input and produces an output that is an estimate of probabilities that the observed bird is of respective species.

In addition to feature detection based on a convolutional neural network and engineered features based on geometric analysis, a third contribution to the species determination is provided by a domain knowledge module 306. This module includes a statistical model which may be in the form of an influence diagram, in particularly a Bayesian belief network (BBN). This module, which will be described in further detail below, is based on the type of knowledge an ornithologist may rely upon when determining the species of an observed bird. Exactly what kind of information to consider in the knowledge-based module 306 may vary depending on geographic location, species of bird typical to that location, and more. For example, if the relevant species of bird exhibit behavior that depends differently on the wind, information about the current wind situation is significant. If, however, all relevant species of bird exhibit behavior that varies in the same way (or not at all) as the wind conditions vary, the current wind situation will not improve predictions.

Input to the knowledge-based module 306 may be collected from additional sensors 302. These sensors may, as already mentioned, be directly connected to the system, or data from these sensors may be available from online services such as weather services. Other data that may be relevant includes time of day, time of the year, observed birds in the relatively recent past (i.e., history of recent species determinations made by the system), and features extracted by the geometry feature extraction module, such as wingbeat frequency, speed, height, flight pattern, and more. The output from the knowledge-based module 305 is a set of probabilities that the species of an observed bird is any one of the respective species the system is configured to recognize.

Thus, the output from the domain knowledge module 306 and the combined module SNN 305 can be combined by a final species determination module 307. Several methods are possible for determining a combined probability distribution. One possibility is simply to calculate the average, or weighted average, of the probabilities provided. Another possibility is to use a Bayesian approach. How much weight each probability should be given can be made dependent on conditions. For example, the relative weight of the probabilities from the neural networks may be reduced if the quality of the video input is low (e.g., the bird is far away from the cameras so the bounding boxes are small in terms of number of pixels), and the relative weight of the BBN may be reduced if some of the values that are used as input to the network are estimates or default values because exact measurements are unavailable.

Variations relative to the exemplary embodiment shown in FIG. 3 are possible without departing from the scope and spirit of the invention. For example, some embodiments may include only a single video camera 104, or be capable of performing detection and species determination on birds that are captured only by one of a plurality of cameras because some cameras have a field of view that is not entirely overlapped by other cameras in the system. Likewise, some embodiments may use the CNN 304 to perform species determination directly without input of geometry features from the geometry features extraction module 303. In such embodiments there may be no combined model neural network 305 and the extracted geometry features are only delivered to the domain knowledge module 306. In other words, geometry features may be entirely omitted from some embodiments, in some embodiments they are only used by the domain knowledge module 306, in some embodiments only by the combined model neural network 305, and in some embodiments geometric features are used by both.

Figure 4:
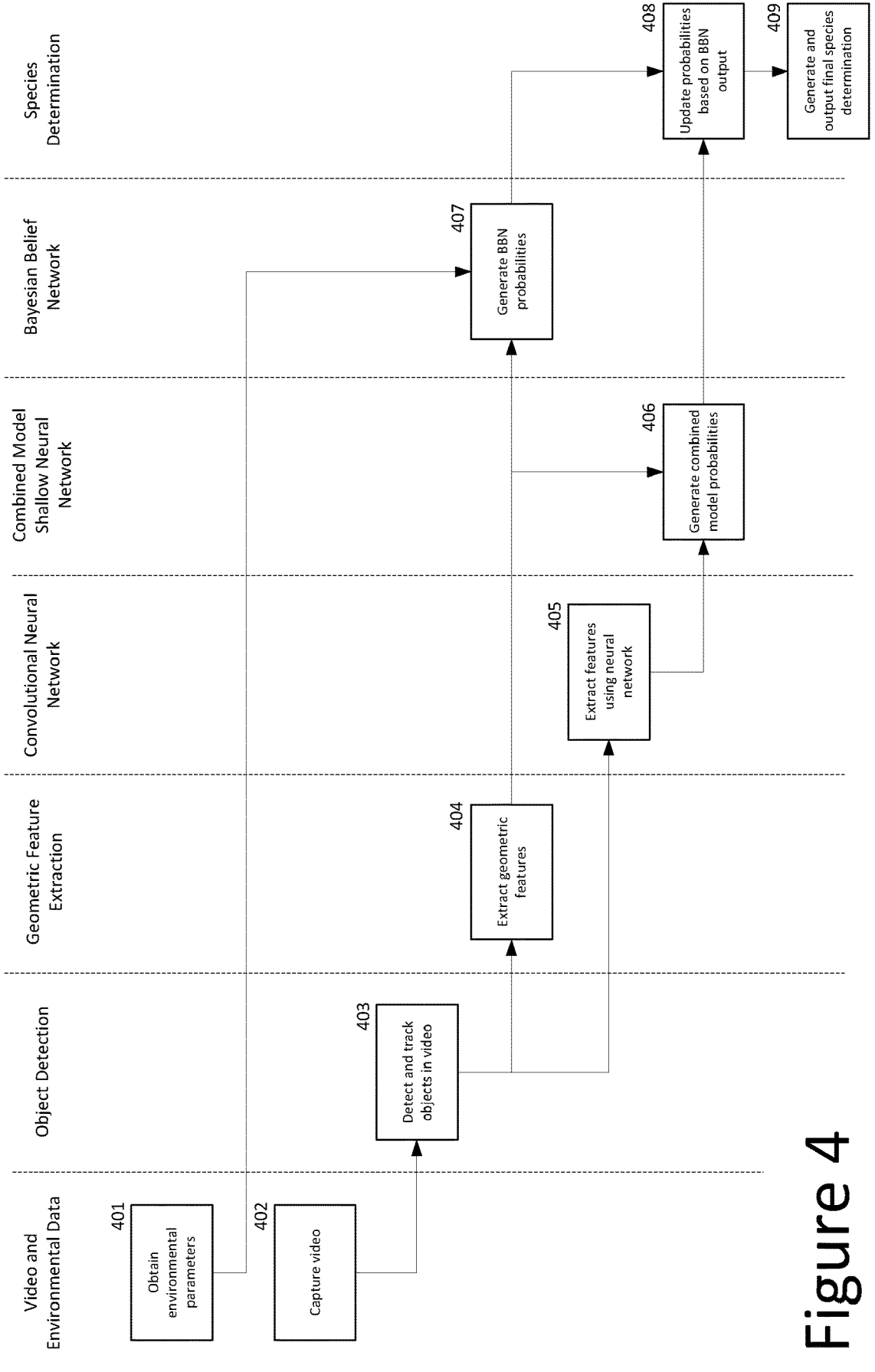
FIG. 4 is a signal flow diagram illustrating how information flows through a system according to an embodiment of the invention.

Reference is now made to FIG. 4 which illustrates the flow of information and associated data processing in an embodiment of the invention, for example the system of FIG. 3. The columns of this diagram roughly correspond with the modules of FIG. 3. It should be noted that while the description of this flow by necessity is sequential, the flow of information may be continuous, and processing may be in parallel. Except for the fact that output from one module by necessity has to be available before it can be processed by a following module, processing may otherwise be performed in parallel, asynchronously, or in a different sequence from the following description.

In a first column of the diagram data is collected. Process 401 obtains environmental parameters, for example from additional sensor modules 302, online services, and internal clocks and tables. Process 402 captures video from the cameras 104. The captured video is then subject to object detection and tracking in process 403. This processing may be performed by edge computer(s) 106 and will be described in further detail below. The output from this process is annotated video images. In particular, detected objects (birds) may be enclosed by a bounding box. The output from the object detection and tracking process 403 is forwarded to two different processes which may operate in parallel. In process 404 geometric features are extracted. This process represents the multi-view geometry analysis performed by module 302 and the geometry feature extraction performed by module 303. The output is, as described above, engineered parameters such as height, speed, wingbeat frequency, flight pattern, and so on.

The other branch that receives input from the object detection and tracking process 403 is a feature extraction process 405 performed by the convolutional neural network 304.

The results of the extraction of geometric features in process 404 and the output from the CNN feature extraction process 405 are delivered as input to a process 406 for generating a combined model based on the output from the two. It should be noted that the input to this process does not necessarily have to include all the features extracted by process 404. In embodiments of the invention process 406 utilizes a shallow neural network 305 that takes the probabilities from the CNN and the geometric features as input and delivers a modified probability distribution as output. As already mentioned, some embodiments may deliver geometry features only to the knowledge based module 306, in which case there is no need to combine learned features from the CNN 304 and engineered features from the geometry feature extraction module 303, and process 406 can be omitted.

The environmental parameters from process 401 and, optionally, some of the geometric features extracted by process 404 are used as input to a knowledge-based process 407 that may be performed by domain knowledge module 306. It is consistent with the principles of the invention to use none, some, or all the geometric features from process 303 in process 407. The geometry-based features used by process 406 and process 407 may be subsets of the output from process 404, and these subsets may be identical they may overlap, or they may be distinct.

As described above with reference to FIG. 3, process 407 may be performed by a module utilizing a Bayesian belief network or some similar representation of conditional probabilities. This will be discussed in further detail below.

The output from the knowledge-based process 407 is a probability distribution representing the probabilities that an observed bird belongs to respective species given the parameters delivered as input. In other words, at this stage two probability distributions have been generated. One is generated by neural networks from video input and geometry features, the other is generated by a Bayesian belief network based on environmental parameters and geometry features. Species determination can now be made by combining the two distributions in a process 408 and generating a final output by process 409. The final output may be the species with the highest probability and may also include an indication of confidence based on the determined probabilities for other species. For example, if the most likely (and thus determined species) has a probability of 55% and the second most likely species has a probability of 40%, confidence may be lower than if the respective probabilities are 80% and 7% for the two most likely species. Confidence may also be adjusted by whether input to the BBN are exact and recent measurements or uncertain estimates or default values. If the probability distributions generated by the two processes are similar this may also strengthen the confidence, while very different probabilities from the two processes may reduce the confidence.

Figure 5:
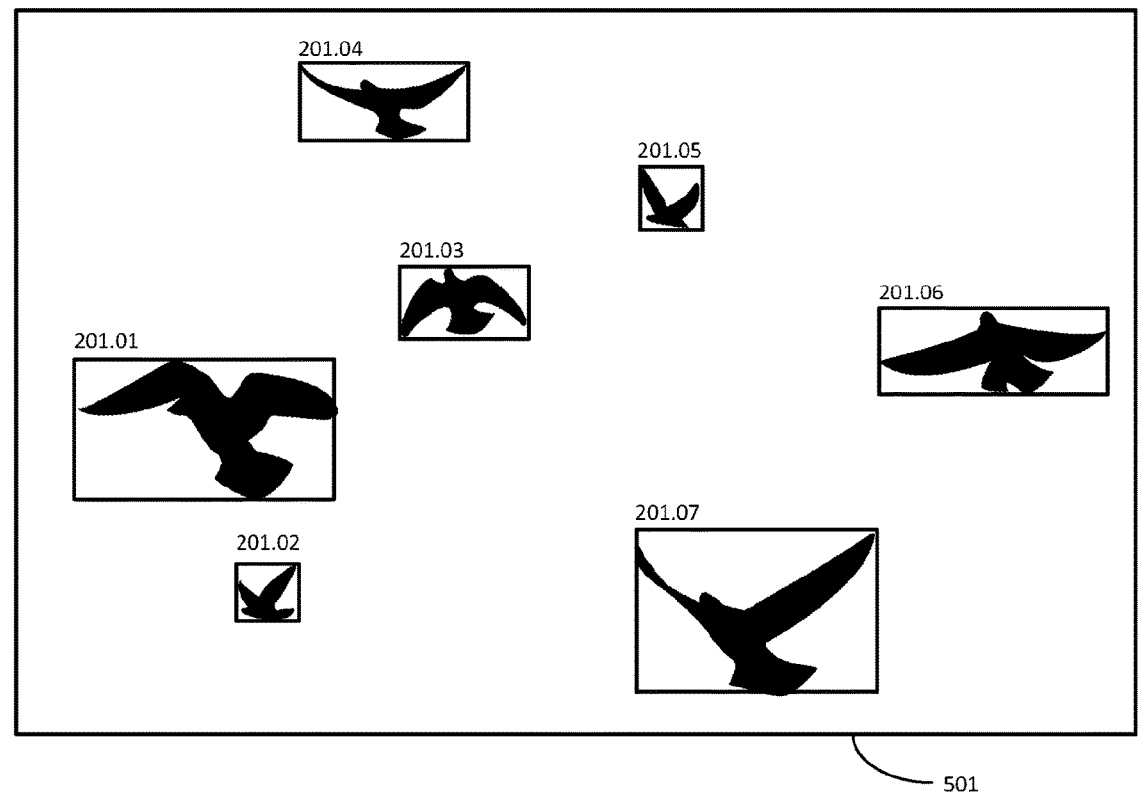
FIG. 5 is an illustration of birds detected in an image and enclosed in bounding boxes.

Turning now to FIG. 5, the bird detection and tracking performed by the bird detection and tracking module 301 will be explained in further detail. As already described, object detection and tracking may be performed by edge computing by one or more computers 106 connected to the cameras 104, in which case the bird detection and tracking module 301 will be a combination of appropriate software installed on the one or more computers 106 in combination with the computers' processing hardware. However, it is consistent with the principles of the invention to perform object detection and tracking remotely, with the bird detection and tracking module 301 implemented in one or more computers on the network 114, for example as a cloud service. There may, however, be advantages to performing these processes as edge computing, i.e., near the cameras that capture the video images. For example, if the frame represents the size of the entire picture 501 captured by the video camera 104, this image 501 contains a lot of background without relevant information. All the background may be compressed by setting it to a uniform color, or the background may be excluded entirely and only the parts containing relevant objects, i.e., birds, may be transmitted. This may save considerable bandwidth.

The captured video image 501 is annotated in that a bounding box is inserted around each detected bird 201. Each bounding box may be associated with an identifying reference. In FIG. 5 this is shown as reference numbers 201.01, 201.02, etc. The process for detecting and tracking objects may be implemented using a neural network (normally not the same neural network as the CNN 304 and SNN 305 discussed above, although this is also a possibility). Training neural networks for the purpose of object detection and object tracking is well known in the art. Available solutions include YOLOv3, which is an algorithm written in the DarkNet framework. DarkNet is an open-source neural network framework written in C and CUDA. YOLOv3 may be used to implement bird detection and tracking in a system according to the present invention. As mentioned, in some embodiments the object detection and tracking may be performed by the same neural network 304 that is trained to perform species determination, which means that the neural network 304 encompasses one large model which also embodies the bird detection and tracking module 301. In these embodiments the object detection and tracking module 301 is represented as part of the capabilities of the neural network 304 and the detection and tracking information that is provided to the multi-view geometry analysis module 302 is provided as output from the neural network 304. In these embodiments the neural network may have a more complicated architecture than CNN and may more accurately be referred to as an artificial neural network, or ANN 304. While the exemplary embodiments described herein include separate detection and tracking module 301 and CNN 304, this may be generalized to include embodiments with an ANN 304 that includes the functionality of the detection and tracking module 301. This is not explicitly shown in the drawings but will be readily understood by those with skill in the art.

Figure 6:
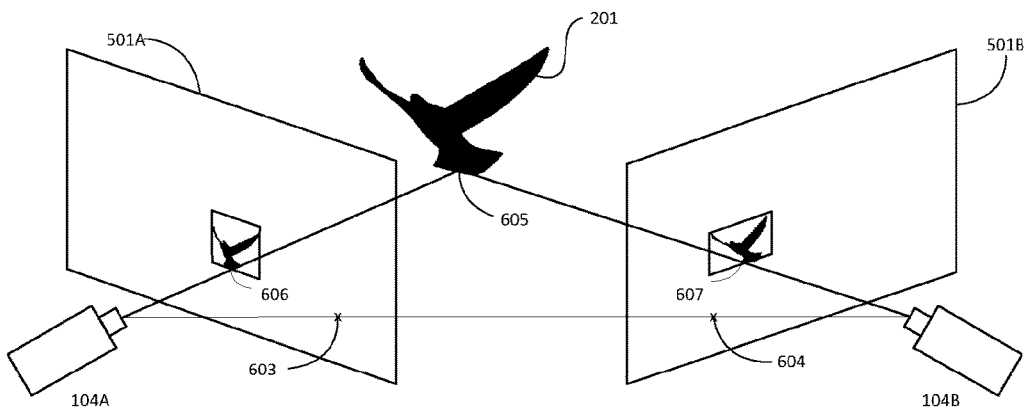
FIG. 6 is an illustration of position determination based on multi-view geometry.

Each bounding box has a position in the image. This information, as well as the known position and field of view of the respective cameras 104, the position in the image defines a line from the camera 104 in a specific direction. As shown in FIG. 6, the multi-view geometry analysis module 302 uses input from several cameras 104A, 104B and may identify objects that are present in several images as intersections of such lines. In FIG. 6 a bird 201 is positioned at 606 in image 501A captured by camera 104A and in position 607 in image 501B captured by camera 104B. The 3D coordinates of the position of the bird 201 can be calculated based on known positions of the cameras 104A, 104B and the positions 606, 607 of the bird 201 in the images. If the cameras 104A, 104B are in each other's field of view they will be present in each other's images at positions 603 and 604 respectively, and this can be used to further calibrate the position determination.

A determined position for an observed bird can be used to provide variables, or parameters, such as flying height. By tracking the same bird over multiple frames spanning a period of time it becomes possible to determine additional variables, such as velocity, acceleration, vertical motion, and combinations of these. More advanced geometrical features from flight trajectory such as curvature, may be parametrized and used as a variable.

In embodiments with only one camera 104, or with the capability of extracting geometry features related to birds that are detected in images from only one camera due to non-overlapping fields of view, it will not be possible to use multi-view geometry analysis such as stereophotogrammetry or epipolar geometry. The position of a detected bird 201 relative to the camera 104 may therefore be based on the position of a bounding box in only one image, but it may be combined with other methods for distance estimation or range finding. Such methods are known from photography, computer vision and other fields of technology and may involve the use of an additional neural network. Detection of wingbeat frequency may be performed in the same way as with several cameras.

Geometry feature extraction has been described as being performed by two modules, a multi-view geometry analysis module 302 (which in the case of only one camera would not be multi-view) and a geometry feature extraction module 303. This is because the first of these modules primarily employs methods such as triangulation (or direction and distance estimation) to determine a 3D position, while the latter primarily performs feature extraction based on determined positions. This means that the two modules may be implemented as separate software modules, or different software applications, and that they may run on different computers. However, it is consistent with the principles of the invention to implement the two modules in a single computer, and even as functionality included in the same software package, software library, or software application.

Figure 7:
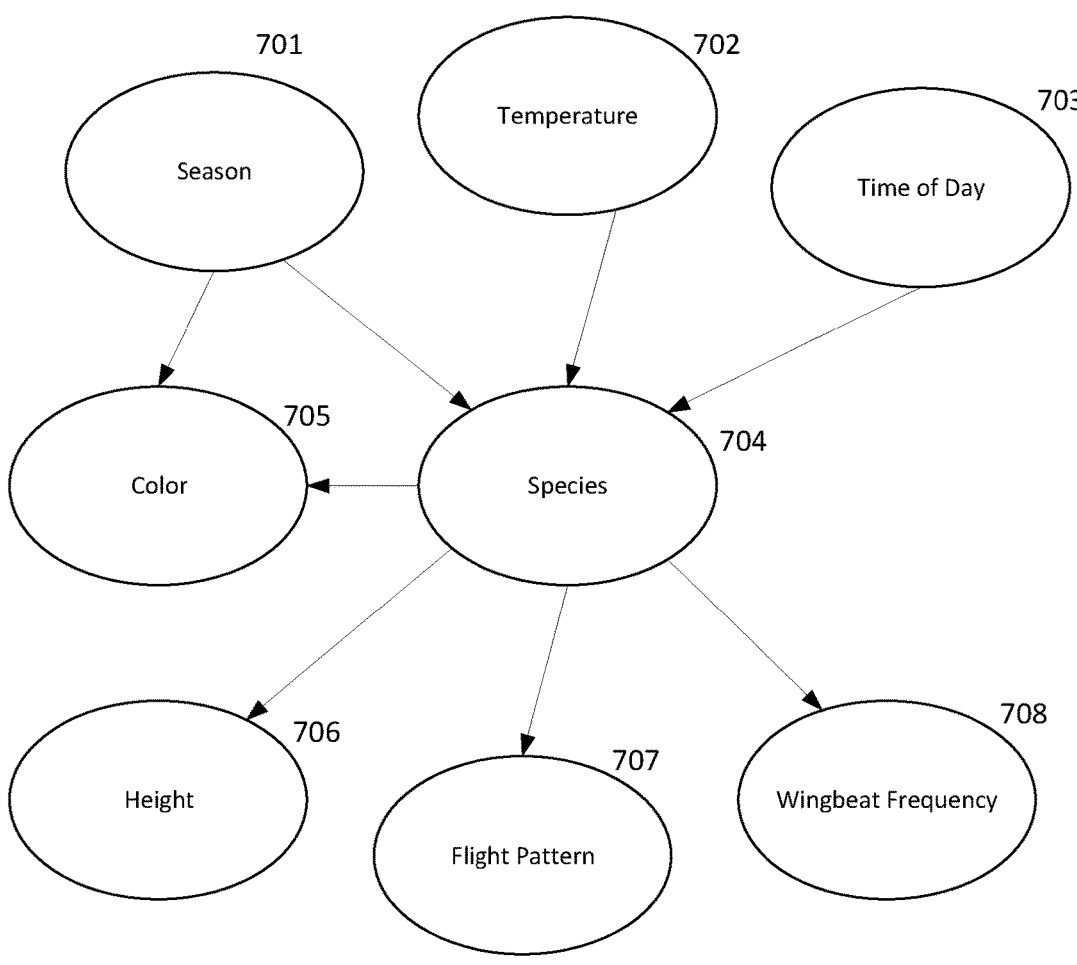
FIG. 7 is an example of a Bayesian belief network that may be used in embodiments of the invention.

Turning now to FIG. 7, the domain knowledge module 306 will be described in further detail. The domain knowledge module 306 takes as input various parameters that a trained ornithologist may rely on when determining what he or she is observing. As already discussed above, which parameters this will be may vary from system to system depending on which species of birds are prevalent in an area, which environmental parameters affect different species of birds in different ways, and which parameters can be reliably obtained. For example, in a system that is primarily designed to distinguish between eagles and gulls, parameters to which these species will adapt their behavior in the same way are of less interest than parameters that cause different behavior in the two species. If, for example, a particular type of weather (e.g., based on temperature or precipitation) will make one species remain nested while the other species is active, the relevant weather parameters will influence the probability of observing the respective types of bird. Conversely, if both species are equally active throughout the year, season is not a particularly valuable parameter for determining probabilities.

A skilled ornithologist with access to relevant statistics, can represent how the various parameters are related in an influence diagram or in terms of some other statistical model. A type of influence diagram that may be particularly suited to this context and that will be used in this exemplary embodiment is a Bayesian belief network (or Bayesian network). A Bayesian belief network is a graphical model that represents a set of variables and their conditional dependencies. The network is a directed acyclic graph where the nodes represent variables and the arrows (edges) represent conditional dependencies. Input to a node is the set of values given as output from the node's parents, and output is the probability, or probability distribution, of the variable represented by the node.

The design of the Bayesian belief network is based on knowledge about relationships and conditional probabilities, and FIG. 7 is intended to illustrate the principles behind such a network. It should be noted that this example is developed for illustrative purposes and does not necessarily represent a network that would be useful in a real environment. For example, color is included as a variable because of its dependencies, but observation of color in a working installation might be considered impractical for various reasons.

Some of the variables are independent and can only be directly observed. These variables do not have parents, and in the example illustrated in FIG. 7 they include season 701, temperature 702, and time of day 703. Temperature 702 may in fact be conditionally dependent on both season 701 and time of day 703, but the fact that temperature is directly observable and that it is neither necessary to estimate the probability of a particular season or a time of day given the observed temperature nor is it necessary to estimate the probability of a temperature given a known season or time of day, these dependencies may not have to be included in the model.

The probability that an observed bird is of a particular species 704 may depend on the season 701, the temperature 702, and the time of day 703. A conditional probability table for species 704 can therefore be established. It should be noted that while this is most straightforward if all variables are discrete (e.g., only can take the values True and False, for example for Summer (Winter), Above freezing (Below freezing), and Day (Night) for the examples in FIG. 7, or only a limited number of discrete values such as Summer, Autumn, Winter, Spring), Bayesian belief networks can also be made for continuous variables. This is well known in the art and will not be discussed in further detail.

A number of additional variables may depend from a given species 704. In the example in FIG. 7 the variables color 705, flying height 706, flight pattern 707, and wingbeat frequency 708 are included. In addition, color 705 also depends on season. The dependency between color and season is not necessarily a useful one for offshore wind farms but could potentially be useful in mountainous regions where some birds change the color of their plumage over the seasons.

Based on statistics about prevalent species of birds in the relevant area, their migration patterns, behavioral response to various weather conditions, and knowledge about flight pattern, height and wingbeat frequency for various species, tables of conditional probabilities can be constructed. Which variables to include and which probabilities they give will most likely be based on a combination of statistics and other knowledge that an ornithologist can provide. The same applies to whether the variables are discrete, are continuous but can be discretized (e.g., above or below a threshold), or should be continuous in the model.

The following tables are included for illustrative purposes only, but show what conditional tables could look like.

Season: Summer T/Winter F; Temperature: Above freezing T/Below freezing F; Time of day: Day T/Night F

| Species: Eagle/Gull | | | | |
|---|---|---|---|---|
| Summer | Above freezing | Day | Eagle | Gull |
| F | F | F | 0.2 | 0.8 |
| F | F | T | 0.25 | 0.75 |
| F | T | F | 0.3 | 0.7 |
| F | T | T | 0.38 | 0.62 |
| T | F | F | 0.12 | 0.88 |
| T | F | T | 0.15 | 0.85 |
| T | T | F | 0.21 | 0.79 |
| T | T | T | 0.45 | 0.55 |

| Eagle/Gull; Height: Above 200 m/Below 200 m | | |
|---|---|---|
| Species | Above 200 m | Below 200 m |
| Gull | 0.02 | 0.98 |
| Eagle | 0.8 | 0.2 |

This example only includes probabilities that have been invented for the purpose of being illustrative, and do not represent any particular real environment. What the first table exemplifies is that given the various possible combinations of season, temperature, and time of day, the probability that an observed bird is either an eagle or a gull may be as shown. The second table gives probabilities for whether an observed bird will be flying above or below a height of 200 meters if it is a gull or an eagle, respectively. Similar tables can be established for all the variables. Based on the graph and the associated conditional probability tables, it is now possible to establish probabilities for unobserved variables based on observed variables. It should be noted that such conditional probabilities can be established in both directions; they are not limited to establishing probabilities for children nodes given observation of parent variables. For example, in the example above, if a bird is observed as flying higher than 200 meters the probability that the bird is an eagle and not a gull is much higher than if the bird is observed at below 200 meters. How much more likely depends on the probability of an observed bird being an eagle in the first place, which again depends on other variables in the network.

So, given an observation of as many variables as possible, the probabilities of the non-observed variables can be changed accordingly. The updated probabilities given observed variables may be referred to as posterior probabilities.

The Bayesian belief network can now be programmed into the domain knowledge module 306 and automatically produce estimated probabilities based on observed variables received from the geometry feature extraction module 303 (e.g., height, wingbeat frequency, flight pattern) and the additional sensor modules 302 (e.g., temperature, season, time of day). The domain knowledge module 306 may be implemented as software-hardware combinations on a single computer, on several computers, or on a cloud service.

As already discussed, exactly which variables, or parameters, to include may depend on conditions in the area where a particular system is being installed.

After species detection has determined that a given observation is a bird belonging to a particular species, possibly in combination with additional data such as confidence and some of the variables used by the domain knowledge module 306, the output may be stored in database 110. Aggregated data may be used to create statistics, and all current, historical, and statistical information may be made accessible to user computers 112 that are connected to the network 114 and are authorized to access the database 110.

The data may be used for planning future operations, and also to initiate deterrents and curtailment, for example by activating audio deterrence or temporary shutdown of a wind farm. Such measures may be manually activated by a person accessing the information available in the database, or a computer 112 may be configured to continuously monitor the data available in the database 110, or received directly from the system, and to activate deterrents or curtailment measures automatically based on predetermined conditions.

The invention claimed is:

1. A method of determining the species of birds in flight, comprising:

capturing at least one video stream of a bird in flight using at least one camera;

generating a first species probability estimate by delivering images from the at least one video stream as input to an artificial neural network that has been trained to recognize species of birds from images;

delivering images from the at least one video stream as input to a computer-executed geometry feature extraction software module that outputs extracted geometric features related to the bird in flight in the at least one video stream;

delivering the extracted geometric features outputted from the computer-executed geometry extraction software module as input to a computer-executed domain knowledge software module utilizing a domain knowledge statistical model to output a second species probability estimate based on the extracted geometric features; and generating a final species probability estimate by combining the first species probability estimate and the second species probability estimate, wherein the extracted geometric features outputted from the computer-executed geometry extraction software module are selected from the group consisting of: size, positions, acceleration, vertical motion, flight trajectory, and wingbeat frequency.

2. The method according to claim 1, further comprising:

generating the first species probability estimate by delivering extracted features from the artificial neural network and the extracted geometric features outputted from the computer-executed geometry feature extraction software module as input to a shallow neural network that has been trained to generate bird species probabilities based on features extracted by an artificial neural network combined with observed geometric features.

3. The method according to claim 2, wherein the extracted geometric features are obtained based on identification of the same bird in a sequence of images from the at least one video stream, and estimating motion based on the change of the identified bird's position between images in the sequence of images.

4. The method according to claim 2, wherein the at least one camera is two or more cameras and the at least one video stream is two or more video streams;

wherein the extracted geometric features are obtained based on a known position of each camera, identification of the same bird in two or more sequences of images from two or more concurrent video streams, determination of the position of the identified bird in the respective images of the respective video streams, and using multi-view geometry analysis to determine 3D coordinates representative of positions of the identified bird relative to the positions of the cameras from the determined positions in the respective images of the respective video streams.

5. The method according to claim 2, wherein one extracted geometric feature is a wingbeat frequency determined by performing Fourier analysis on a sequence of images from the at least one video stream, and identifying a dominant frequency component that is inside a frequency interval consistent with wingbeat frequencies for birds.

6. The method according to claim 1, further comprising:

training the artificial neural network by delivering a dataset including labeled images of relevant bird species as input to the artificial neural network.

7. The method according to claim 1, further comprising:

performing object detection on images from the at least one video stream and annotating the images with bounding boxes drawn around each object that is identified as a bird.

8. The method according to claim 7, wherein object detection is performed using a second artificial neural network.

9. The method according to claim 1, further comprising:

providing the species with the highest determined final species probability as output.

10. The method according to claim 9, further comprising using the output to control a means of deterrent or curtailment in order to reduce a risk that the bird of the determined species is injured by a wind farm installation.

11. The method according to claim 1, wherein the domain knowledge statistical model is a Bayesian belief network and/or one or more artificial neural networks are convolutional neural networks.

12. A system for determining the species of birds in flight, comprising:

at least one video camera;

one or more computer processors programmed to execute an artificial neural network configured to receive video images from the at least one video camera and trained to recognize species of birds from images;

a geometry feature extraction software module configured to receive at least one video stream from the at least one video camera and to output extracted geometric features related to birds captured in flight in the at least one video stream;

a domain knowledge software module with a domain knowledge statistical model, configured to receive the extracted geometric features outputted by the geometry feature extraction software module and to generate a probability of observing respective species of birds given the extracted geometric features; and a species determination software module configured to receive a first species probability estimate based on output from the artificial neural network and a second species probability estimate based on output from the domain knowledge software module and to generate a final species probability estimate, wherein the extracted geometric features outputted from the computer-executed geometry extraction software module are selected from the group consisting of: size, positions, acceleration, vertical motion, flight trajectory, and wingbeat frequency.

13. The system according to claim 12, further comprising:

a shallow neural network configured to receive extracted features from the artificial neural network and extracted geometry features outputted from the geometry feature extraction software module, and to generate the first species probability estimate.

14. The system according to claim 13, wherein the geometry feature extraction software module is configured to received data related to at least one video stream, extract geometric features based on identification of the same bird in a sequence of images from the at least one video stream, and to estimate motion based on the change of the identified bird's position between images in the sequence of images.

15. The system according to claim 13, wherein the at least one camera is two or more cameras and the at least one video stream is two or more video streams;

the one or more computer programs being programmed to further execute a multi-view geometry analysis software module configured to receive a known position of each camera, receive data related to at least two concurrent video streams, determine a position of a bird identified in the respective images of the respective video streams, determine the position of the identified bird in the respective images of the respective video streams, and use multi-view geometry analysis to determine 3D coordinates representative of positions of the identified bird relative to the positions of the cameras from the determined positions in the respective images of the respective video streams.

16. The system according to claim 13, wherein the geometry features extraction software module is further configured to determine a wingbeat frequency by performing Fourier analysis on a sequence of images from the at least one video stream and identifying a dominant frequency component that is inside a frequency interval consistent with wingbeat frequencies for birds.

17. The system according to claim 12, wherein the one or more computer processors is programmed to further execute a bird detection and tracking software module configured to receive input from at least one video camera and perform object detection and to annotate images by drawing bounding boxes around each object that is identified as a bird.

18. The system according to claim 17, wherein the bird detection and tracking software module includes a second artificial neural network.

19. The system according to claim 12, wherein the species determination software module is further configured to deliver the final species probability estimate as output to be stored, displayed, or used to control a process of deterrence or curtailment in order to reduce a risk that the bird of the determined species is injured by a wind farm installation.

20. The system according to claim 12, wherein the domain knowledge statistical model is a Bayesian belief network and/or one or more artificial neural networks are convolutional neural networks.

* * * * *